Figures 1, 2:
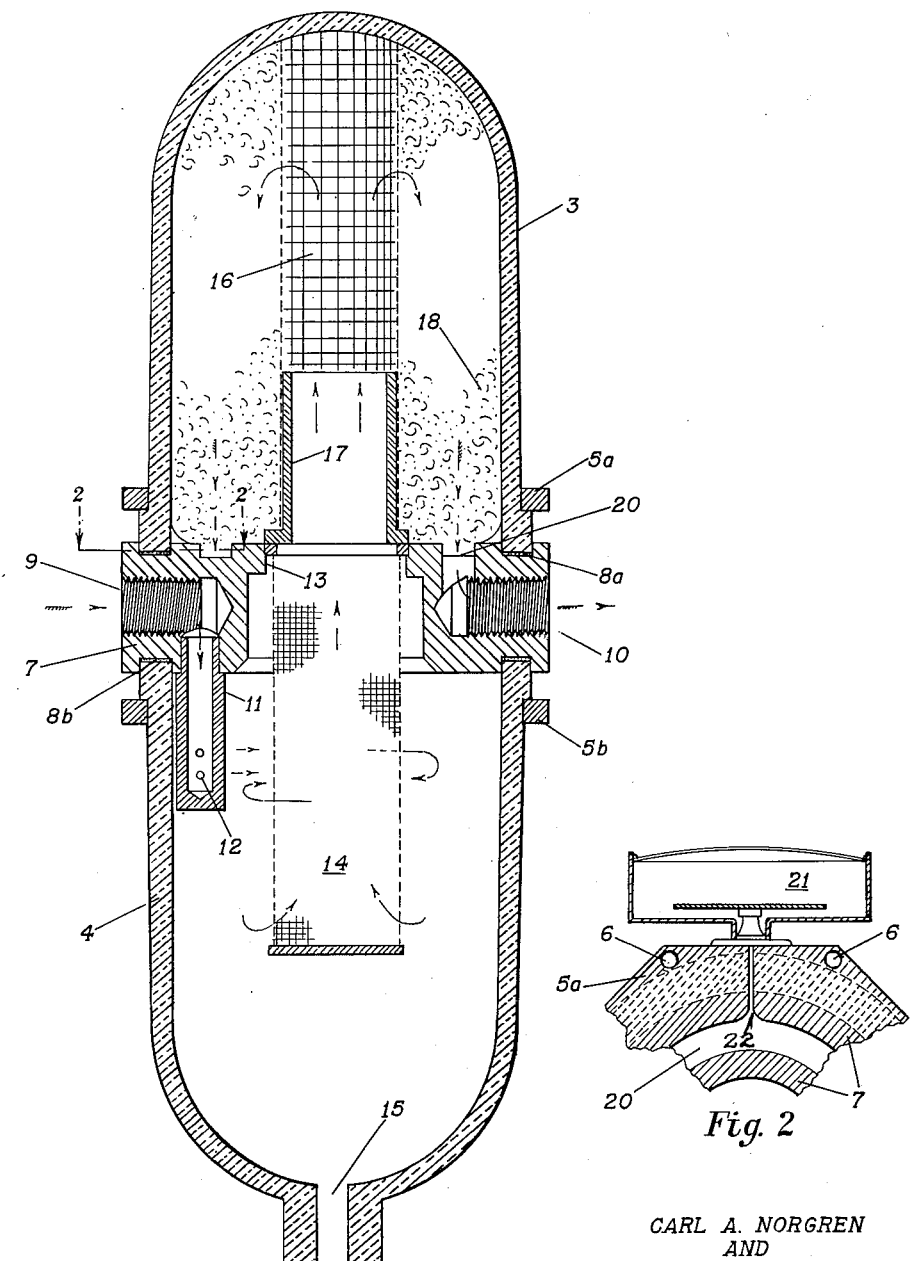

Nov. 7, 1950     C. A. NORGREN ET AL     2,528,539

AIR FILTER

Filed Oct. 22, 1945

CARL A. NORGREN
AND
KENNETH C. MOSIER
INVENTORS.

BY

*W. A. McGrew*

ATTORNEY

Patented Nov. 7, 1950

2,528,539

UNITED STATES PATENT OFFICE 2,528,539

AIR FILTER

Carl A. Norgren and Kenneth C. Mosier, Denver, Colo.; said Mosier assignor to said Norgren Application October 22, 1945, Serial No. 623,656

4 Claims. (Cl. 183—34)

This invention relates to air filters, and more particularly relates to a filter for removal of contained moisture from the air stream of pneumatic lubricating systems.

It is conventional practice to lubricate the wearing parts of machine tools by conducting an oil-carrying air stream to such parts. Usually the quantity of oil so delivered is ample to satisfy the lubricating requirements and the amount of contained moisture reaching such parts is insufficient to impair the lubricating properties.

However, in the case of high speed spindles and similar wearing parts, the amount of contained moisture in the air stream must be held within very low limits, and the conventional filters heretofore employed in such systems frequently are unable to effect sufficient moisture removal to satisfy operating requirements.

It is an object of the present invention to provide a simple, durable and efficient air filter for pneumatic lubricating systems which affords a selective control of the degree of moisture removal from the air stream.

Another object of the invention is to provide an air filter for pneumatic lubricating systems which gives a visible indication of the moisture content of the air stream discharging from the filter at all times during operation.

A further object of the invention is to provide a simple, durable and efficient filter element for use in the air filters of pneumatic lubricating systems.

Other objects reside in novel details of construction and novel combinations and arrangements of parts, all of which will be fully described in the course of the following description.

Briefly stated, the present invention resides in the discovery that by a chemical treatment of the filter element of an air filter, it is possible to provide a color indication of the moisture content of the air stream discharging from the filter, and in this way, insure proper operator control at all times. The invention resides in the further discovery that by proper directional changes and centrifugal movement of the air stream entering the filter, contained moisture will be deposited out of the air stream onto the surfaces of the structure containing the air stream. Advantage is taken of this discovery to effect a substantial moisture removal before the air stream is passed into a filter element wherein the final moisture removal is effected.

The practice of the invention will be best understood by reference to the accompanying drawings illustrating a typical embodiment of the structural arrangement. In the drawings, in the respective views of which like parts have been designated similarly, Fig. 1 is a vertical section through an air filter embodying features of the present invention; and Fig. 2 is a fragmentary section taken along the line 2—2 of Fig. 1, with the passage 22 located at approvimately 90° to the axis of the bore 9 in Fig. 1.

The preferred embodiment of this invention, as illustrated in Fig. 1, comprises an upper bowl section 3 and a lower bowl section 4 suitably joined as by clamping rings 5a and 5b held together by screws 6 (Fig. 2). The bowls are transparent and preferably composed of a transparent thermo-molding plastic, although glass or other transparent compositions may be used, if desired.

An annular partitioning member 7 is disposed between the clamping rings 5a and 5b and has seats 8a and 8b for reception of bowls 3 and 4 which are held therein by the clamping action of screws 6. At one side, the member 7 is tapped to provide an air inlet 9, while its opposite side is similarly tapped to provide a discharge outlet 10. A small tube 11 depends from member 7 in communicating relation to inlet 9 and has its lower end closed, and a series of small ports 12 near the bottom of the tubular passage are arranged to discharge the incoming air at high velocity into the bowl in a direction substantially tangential thereto.

Partition member 7 is centrally apertured as shown at 13 and a fine mesh tubular screen member 14 extends downwardly into bowl 4 from this opening and provides the only passage from bowl 4 into bowl 3. At its lower end, bowl 4 is provided with a discharge outlet 15 through which the separated liquid flows by gravity.

Another tubular screen 16 of relatively coarse mesh extends upwardly through bowl 3 from an imperforate tube 17 seated at the upper side of opening 13 and tube 17 and screen 16 serve as a support for a body of filter medium 18 which substantially fills the interior of the bowl. Preferably, filter medium 18 is formed by a spiral winding of cotton thread or other suitable absorbent material which has been chemically treated as by cobaltous chloride to provide a color indicator of the moisture content of the air passing through the medium.

An annular groove 20 in the upper surface of partition member 7 communicates with outlet 10 and the moving air stream after passing through screen 16 and filter medium 18 flows along the annular passage to pass finally from the filter through outlet 10.

In order to provide an accurate measure of the pressure of the discharging air stream, an indicating gage 21 is mounted on the exterior surface of partition member 7 and communicates with groove 20 through a passage 22. With this understanding of the structural arrangement employed, the operation will now be described.

When the filter is used as the final moisture removal stage of a pneumatic lubricating system, its inlet 9 and outlet 10 are connected in the line between the compressed air source and the lubricant supply unit. Air entering at 9 is caused to make a right angle turn and descend through the restricted passage in tube 12 to discharge into bowl 4 through the further restricted ports 12 after making another right angle turn.

These changes in direction, coupled with the reduction in the space through which the gas is flowing, serves to impart a high velocity discharge to the gas in a direction substantially tangential of the inner surface of bowl 4. The changes in direction also tend to cause a separation of the contained moisture from the air stream and upon discharge into bowl 4 in the cyclonic movement, the depositing moisture collects along the sides of bowl 4 and flows by gravity to the bottom, from which it passes through outlet 15 to a control valve or other receptacle attached to the bottom of the bowl. The only escape for the swirling air from bowl 4 is through the fine mesh screen 14 and upwardly through tube 17, after which it passes through the openings of coarse screen 16 and enters the body of filter medium 18.

After travelling through the filter medium 18, the air finally reaches groove 20 and flows into the opening into outlet 10 through which it discharges into the air line. Any moisture not removed by the whirlwind effect in bowl 4 and in passage through screen 14 will be absorbed by the filter medium 18 and cause a visible color change in the medium. So long as the filter medium is entirely dry, it has a bright blue color due to the chemical treatment, but as soon as it is wetted, the color changes progressively from blue to pink as water absorption increases. By having a clear plastic bowl or other transparent cover, the moisture condition is observable at all times and whenever an operator discovers any substantial color change, the given filter unit can be removed and a new filter element substituted.

After such substitution if the color change persists, it is obvious that an undue amount of moisture is coming to the filter which will require some other correctional change usually at the compressed air source. When a unit has been so removed, the filter medium may be taken out and dried, and after it is completely dry, as indicated by the color change back to blue, the filter element can be re-used.

From the foregoing, it will be apparent that a two-way separation is obtained in bowl 4 with the entering high velocity stream subjected to a cyclonic movement in which the contained moisture is separated by the centrifugal action. After separation, it drains along the walls of the bowl until it reaches the outlet 15 which preferably is connected with an automatic valve element for periodic discharge of the liquid. Such a discharge valve has been shown in my co-pending application, Serial No. 637,136, filed December 24, 1945, and entitled "Automatic Drain Valve."

After the initial separation in the cyclonic action, the air enters through screen 14 where a further separation is attained and thus the moisture in the air passing to the upper bowl 3 has been essentially reduced to a point which should record little, if any, color change on the filter element 18.

However, any condition causing excess moisture, such as too great an amount of contained moisture in the air stream, will be shown immediately by the color indicator in the filter element 18.

Since the direction of air travel is from the inside of filter element 18 to the outside, a considerable amount of moisture must be deposited in the material before a color change is apparent on its exterior surface. At any time such a color change is observed, it is apparent that excess moistening has occurred in filter element 18, indicating replacement is necessary. Thus, the operator is able to keep the system effectively under control at all times.

It will be apparent that variations in structural arrangement may be resorted to while maintaining the operating principle of the present invention. For this reason, the structure illustrated in the accompanying drawings is intended merely as a typical example of the practice of the present invention, the scope of which has been set forth in the hereunto appended claims.

What we claim and desire to secure by Letters Patent is:

1. A filter for compressed air lines and the like of the type adapted to remove entrained solids and reduce the moisture content of compressed air comprising a body having an inlet and an outlet, upper and lower bowls secured to the faces of the body, the lower bowl having a smooth internal wall of circular cross section and the upper bowl being transparent, a tube extending downwardly near the inner wall of the lower bowl and communicating with the inlet, the lower end of the tube being closed, said tube having an opening in its wall spaced downwardly from said body for directing the air in a circular path along the inner wall of the lower bowl whereby water is deposited from the air on to the wall of the bowl and dirt is entrapped by the water, discharge means near the bottom of the lower bowl, a centrally disposed conduit in the body connecting the upper and lower bowls and extending into the former, said outlet communicating with the upper bowl, and a porous filter medium between the centrally disposed conduit and the outlet.

2. A filter for compressed air lines and the like of the type adapted to remove entrained solids and reduce the moisture content of compressed air comprising a body having an inlet and an outlet, upper and lower bowls secured to the faces of the body, the lower bowl having a smooth internal wall of circular cross section and the upper bowl being transparent, a tube extending downwardly near the inner wall of the lower bowl and communicating with the inlet, the lower end of the tube being closed, said tube having an opening in its wall spaced downwardly from said body for directing the air in a circular path along the inner wall of the lower bowl, the area of the opening being less than the internal cross sectional area of the tube whereby the centrifugal force generated by the increased air velocity deposits water on to the wall of the bowl and dirt is entrapped by the water, discharge means near the bottom of the lower bowl, a centrally disposed conduit in the body connecting the upper and lower bowls and extending into the former, said outlet communicating with the upper bowl, and a porous filter medium between the centrally disposed conduit and the outlet.

3. A filter for compressed air lines and the like of the type adapted to remove entrained solids and reduce the moisture content of compressed air comprising a body having an inlet and an outlet, upper and lower bowls secured to the faces of the body, the lower bowl having a smooth internal wall of circular cross section and the upper bowl being transparent, a tube extending downwardly near the inner wall of the lower bowl and communicating with the inlet, the lower end of the tube being closed, said tube having an opening in its wall spaced downwardly from said body for directing the air in a circular path along the inner wall of the lower bowl whereby water is deposited from the air on to the wall of the bowl and dirt is entrapped by the water, discharge means near the bottom of the lower bowl, a centrally disposed conduit in the body connecting the upper and lower bowls, said outlet communicating with the upper bowl, a cylindrical screen over the conduit projecting into the lower bowl and a filter in the upper bowl sealed over the conduit, said filter comprising a hollow porous body of wound string.

4. A filter for compressed air lines and the like of the type adapted to remove entrained solids and reduce the moisture content of compressed air comprising a body having an inlet and an outlet, upper and lower bowls secured to the faces of the body, the lower bowl having a smooth internal wall of circular cross section and the upper bowl being transparent, a tube extending downwardly near the inner wall of the lower bowl and communicating with the inlet, the lower end of the tube being closed, said tube having an opening in its wall spaced downwardly from said body for directing the air in a circular path along the inner wall of the lower bowl whereby water is deposited from the air on to the wall of the bowl and dirt is entrapped by the water, discharge means near the bottom of the lower bowl, a centrally disposed conduit in the body connecting the upper and lower bowls, said outlet communicating with the upper bowl, a cylindrical screen over the conduit projecting into the lower bowl and a filter in the upper bowl sealed over the conduit, said filter comprising a hollow porous body of wound string impregnated with a compound adapted to change color when reacted with liquid water.

CARL A. NORGREN.
KENNETH C. MOSIER.

REFERENCES CITED

The following references are of record in the file of this patent:

UNITED STATES PATENTS

| Number | Name | Date |
|---|---|---|
| 1,423,412 | Garner | July 18, 1922 |
| 1,771,042 | Ireland | July 22, 1930 |
| 2,009,352 | Adams | July 23, 1935 |
| 2,044,095 | Moore | June 16, 1936 |
| 2,068,048 | Adams | Jan. 19, 1937 |
| 2,144,681 | Kraissl, Jr. | Jan. 24, 1939 |
| 2,170,074 | Hewitt | Aug. 22, 1939 |

FOREIGN PATENTS

| Number | Country | Date |
|---|---|---|
| 345,672 | Great Britain | Mar. 23, 1931 |